Jan. 27, 1942.  E. W. MILLER  2,271,438
GEAR CUTTING AND FINISHING MACHINE
Filed April 9, 1938  14 Sheets-Sheet 4
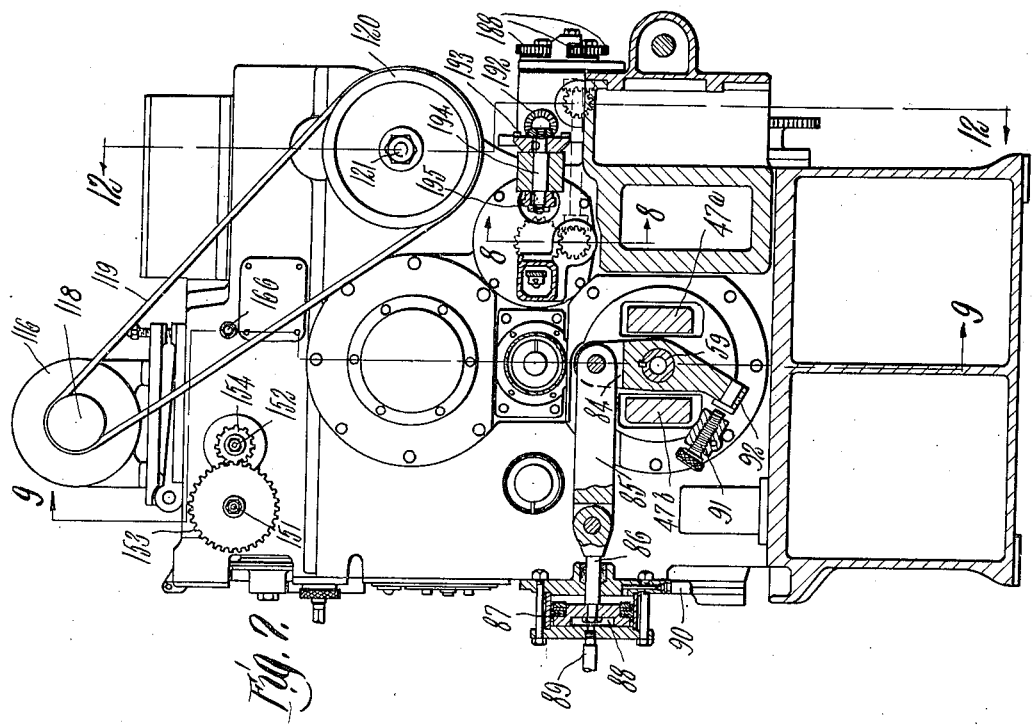
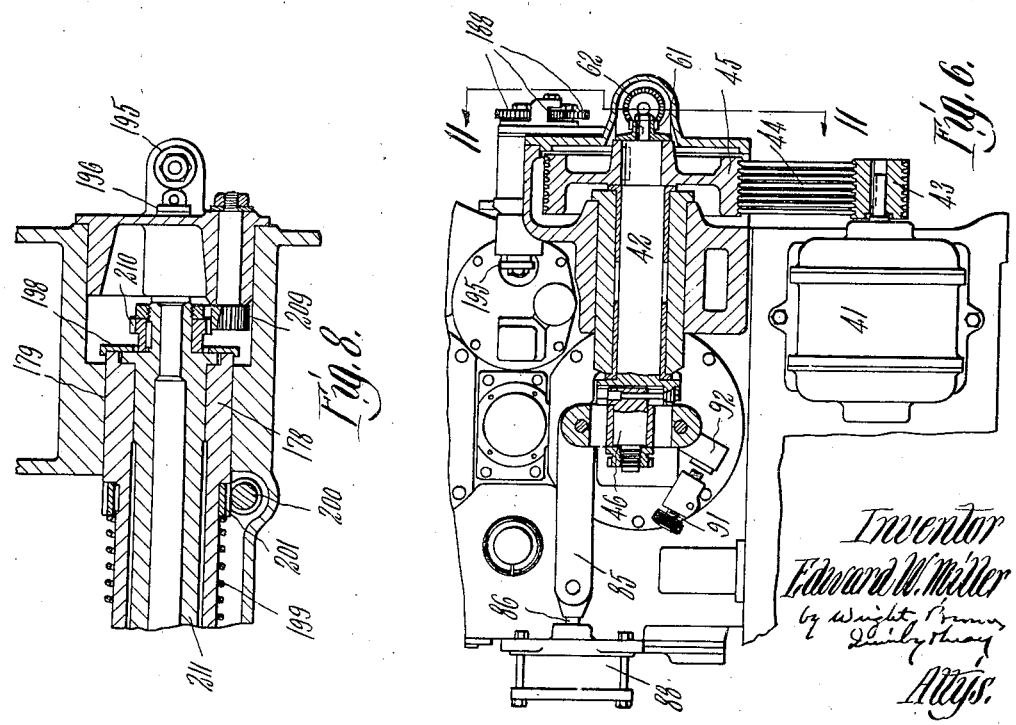
Inventor
Edward W. Miller
by Wright, Brown, Quinby & May
Attys.

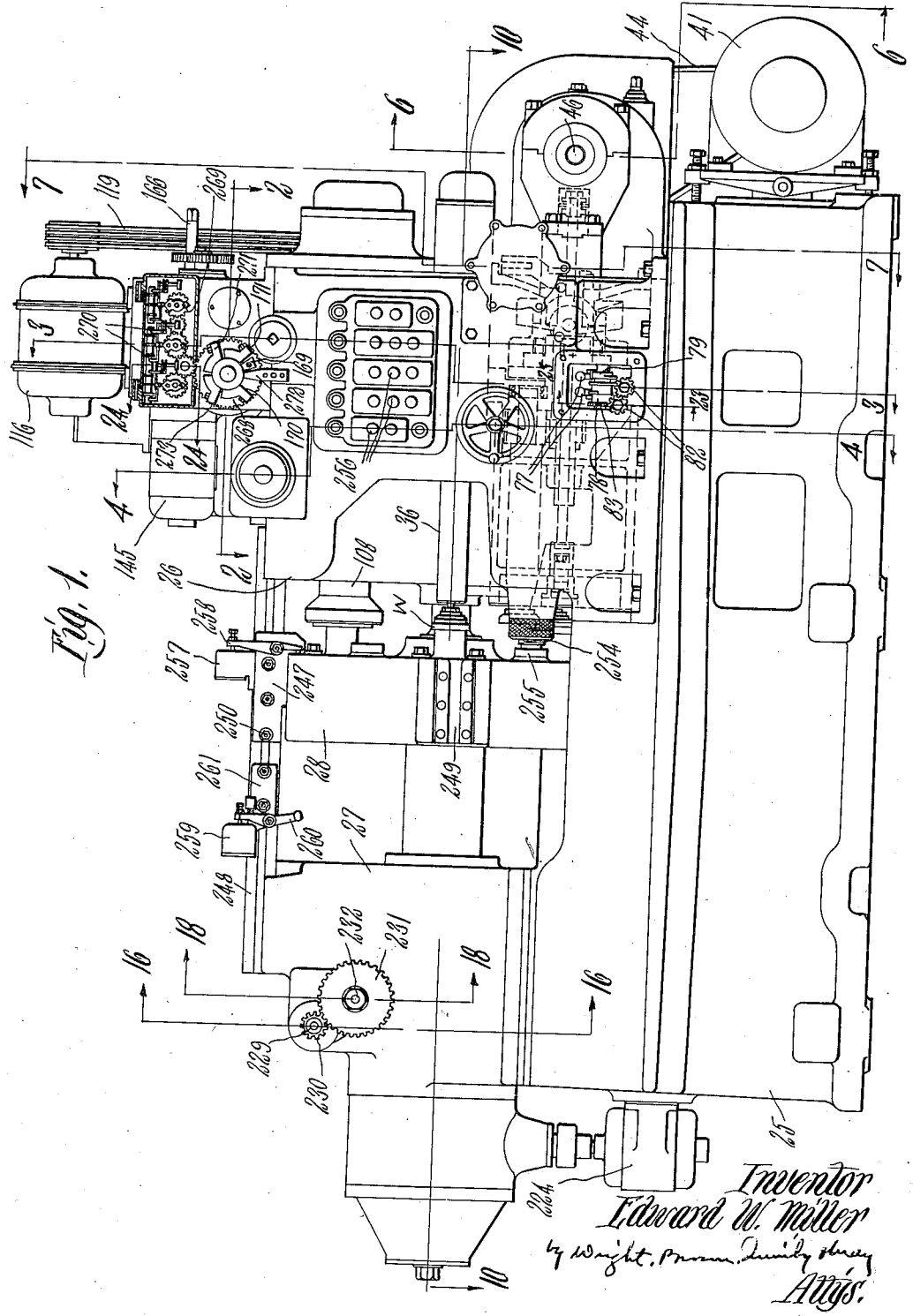

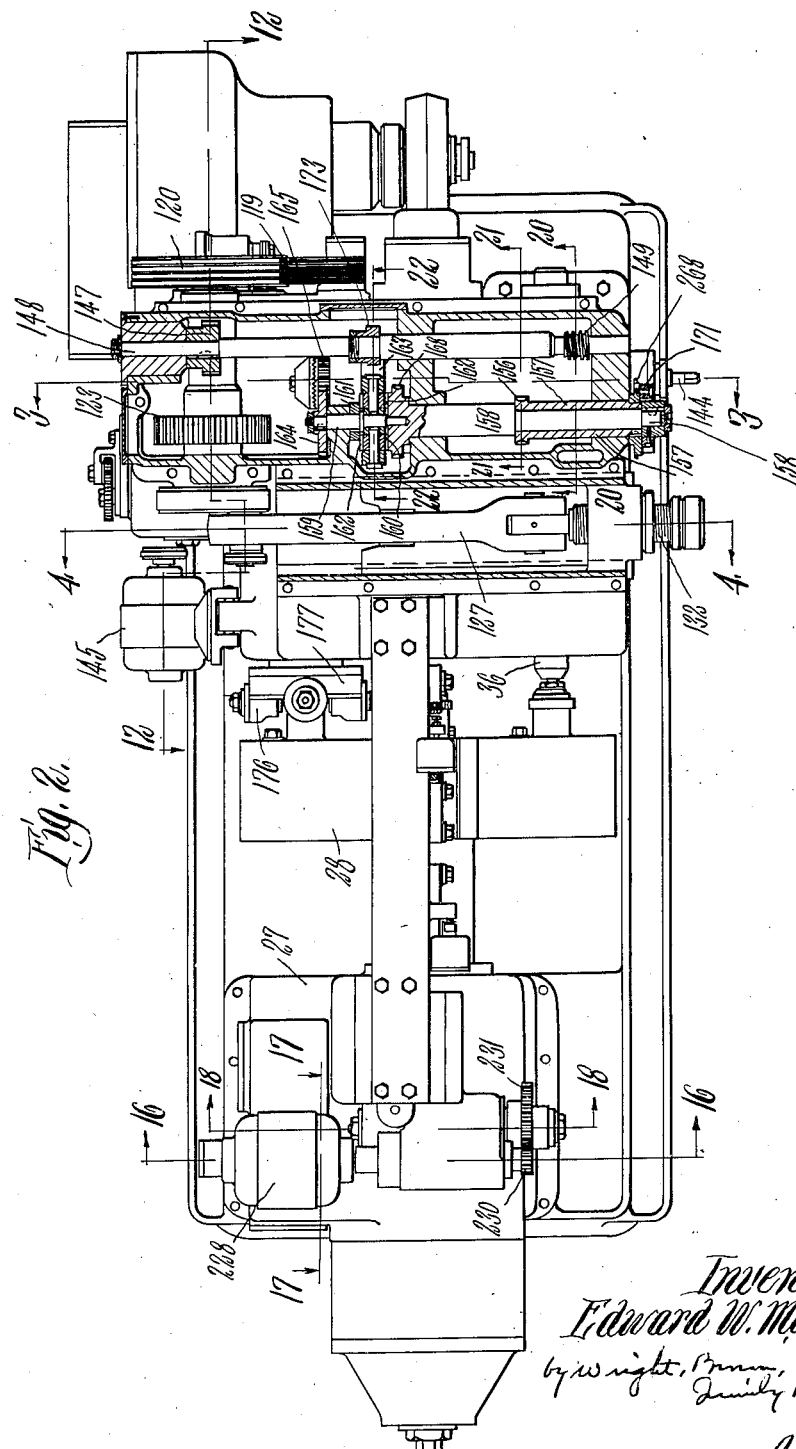

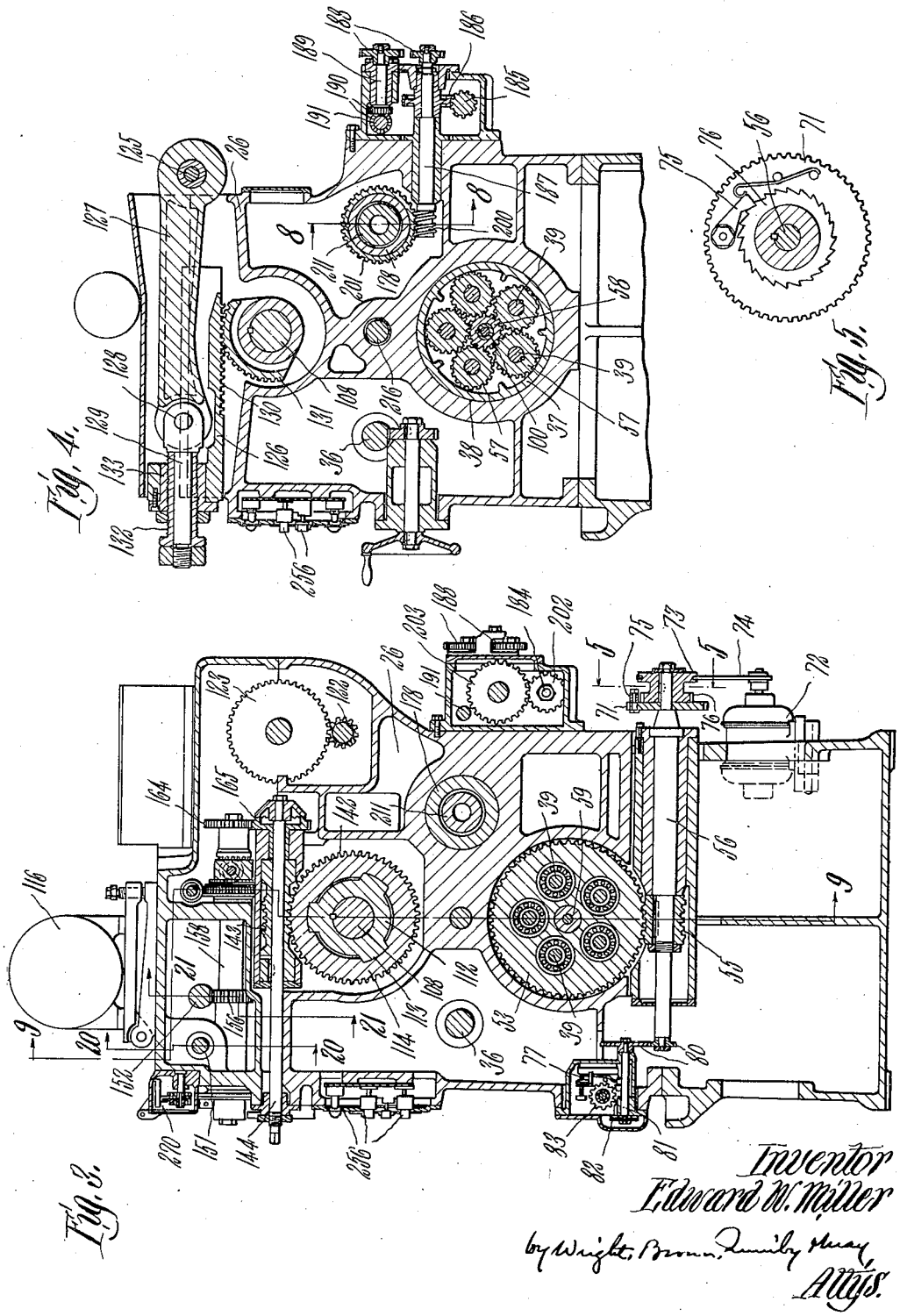

Jan. 27, 1942.					E. W. MILLER						2,271,438
							GEAR CUTTING AND FINISHING MACHINE
							Filed April 9, 1938					14 Sheets-Sheet 5

Inventor
Edward W. Miller
by Wright, Brown, Quinby & May
Attys.

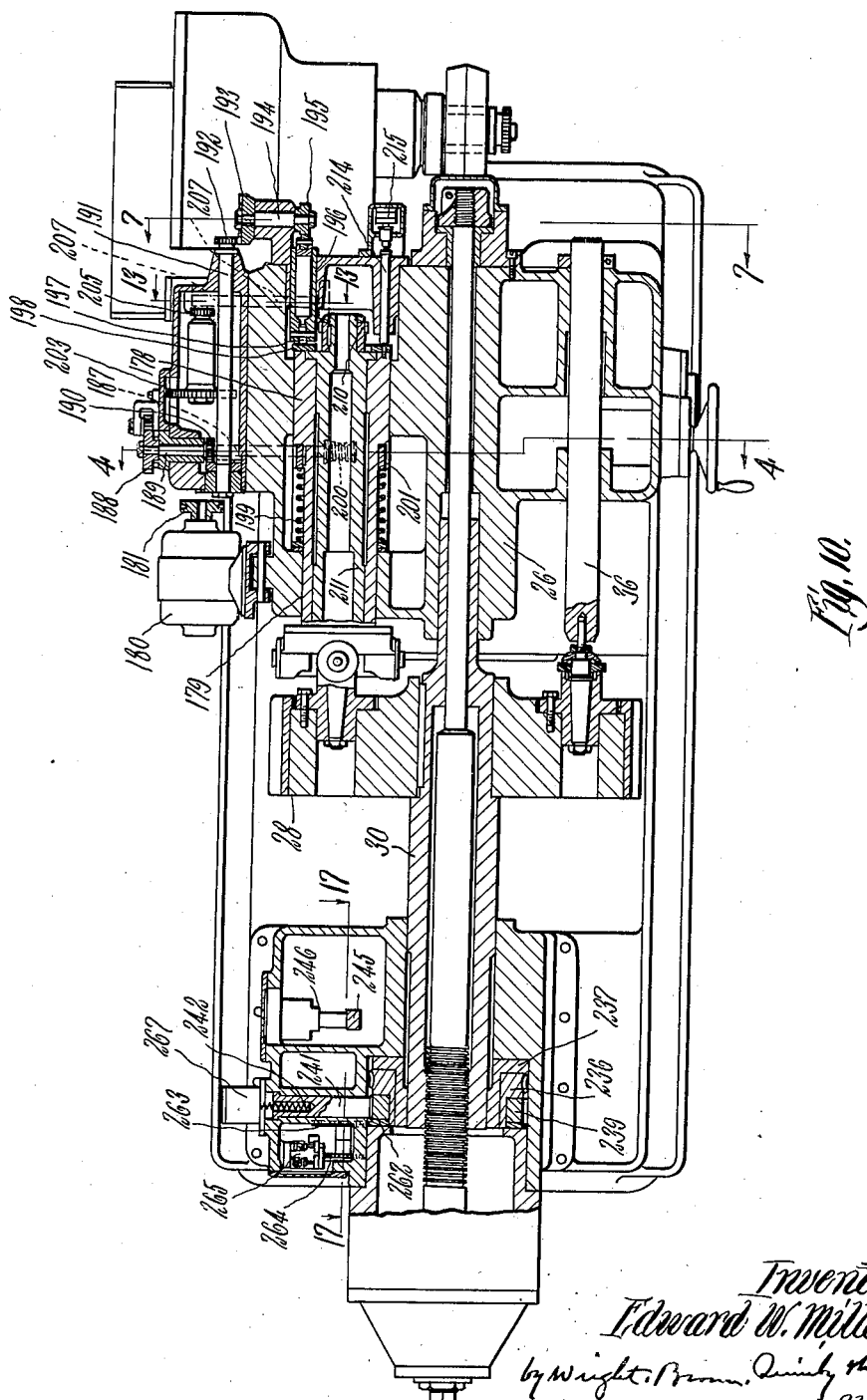

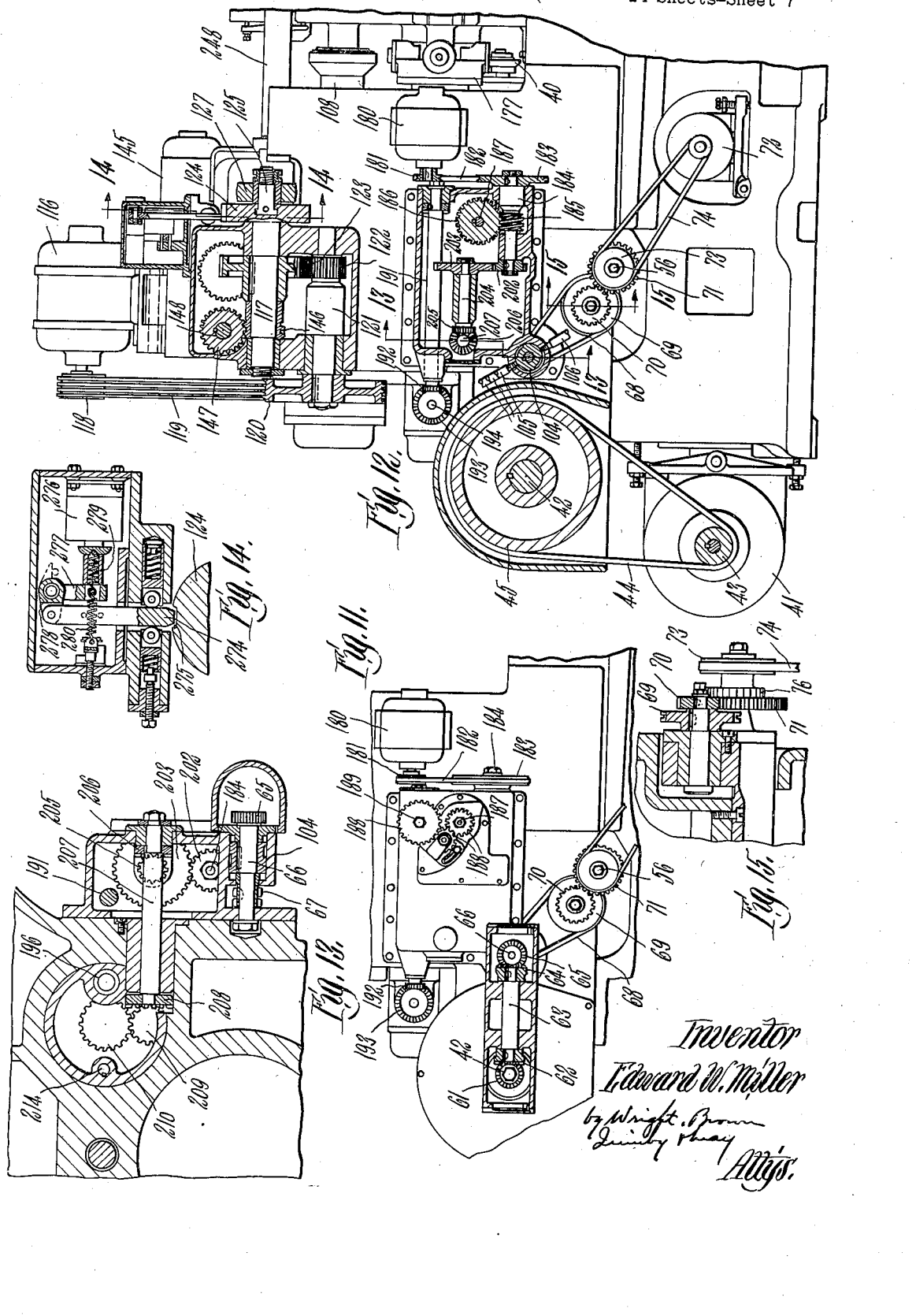

Jan. 27, 1942.  E. W. MILLER  2,271,438
GEAR CUTTING AND FINISHING MACHINE
Filed April 9, 1938  14 Sheets-Sheet 8
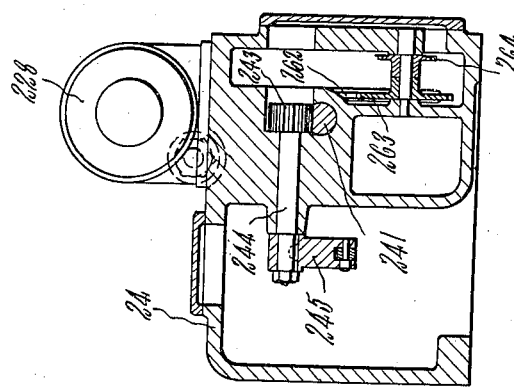
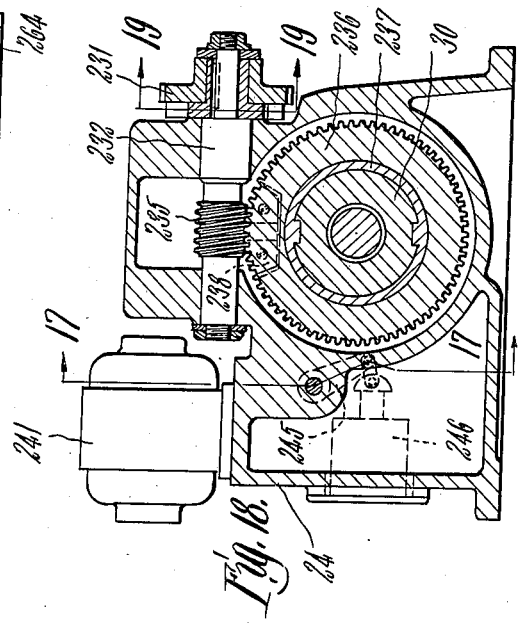
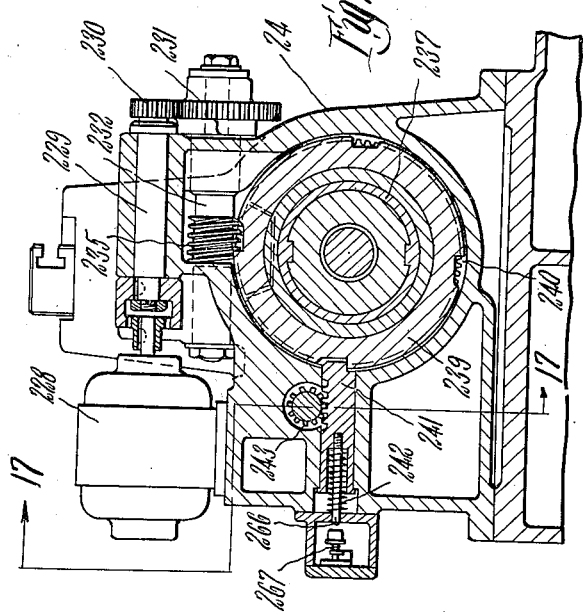
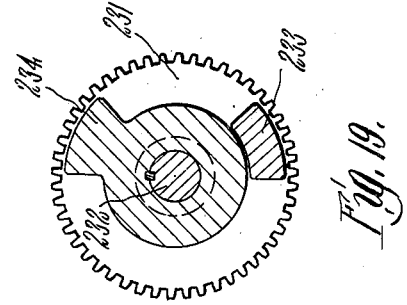
Inventor
Edward W. Miller
by Wright, Brown, Quinby & May
Attys.

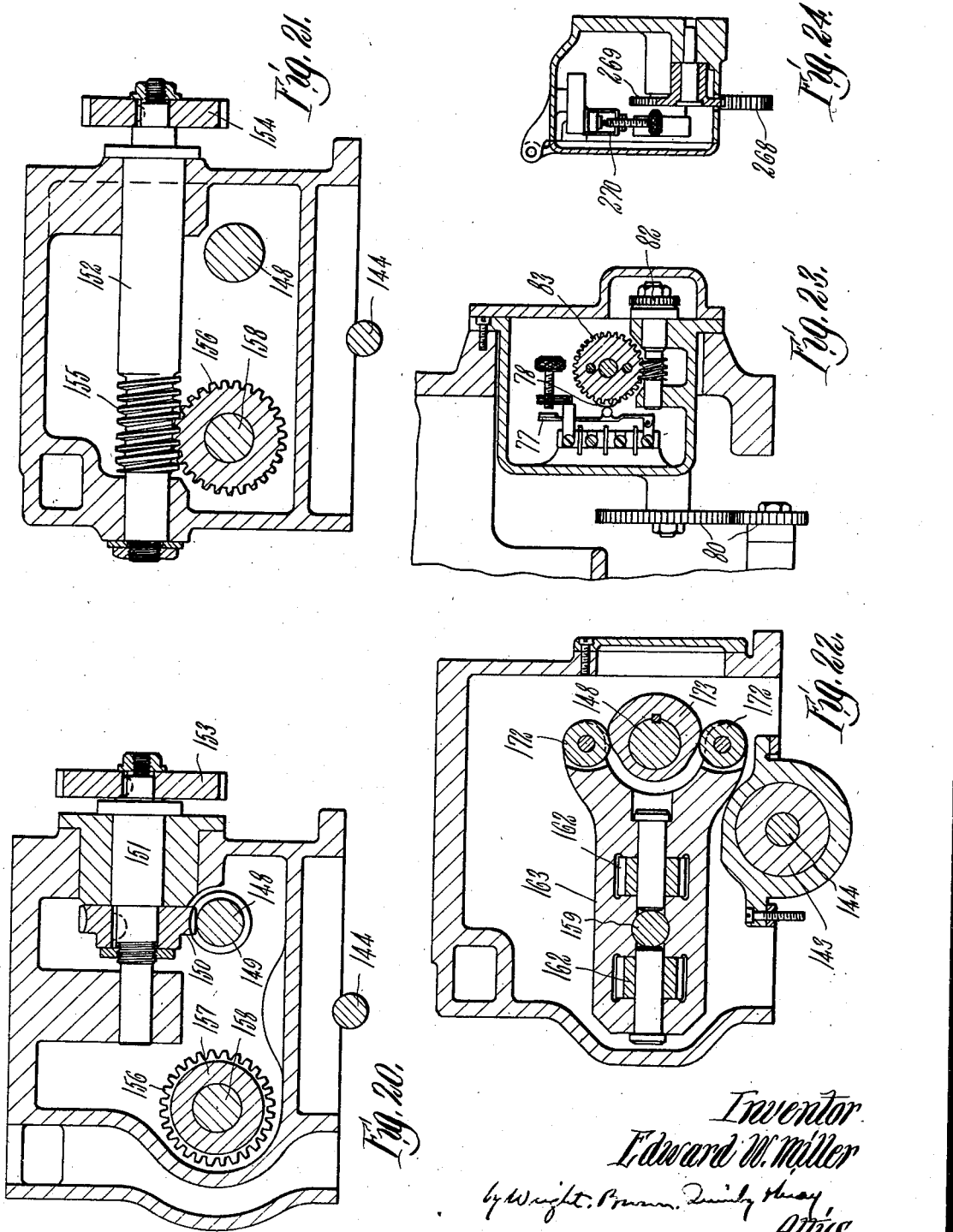

Jan. 27, 1942.  E. W. MILLER  2,271,438
GEAR CUTTING AND FINISHING MACHINE
Filed April 9, 1938  14 Sheets-Sheet 10
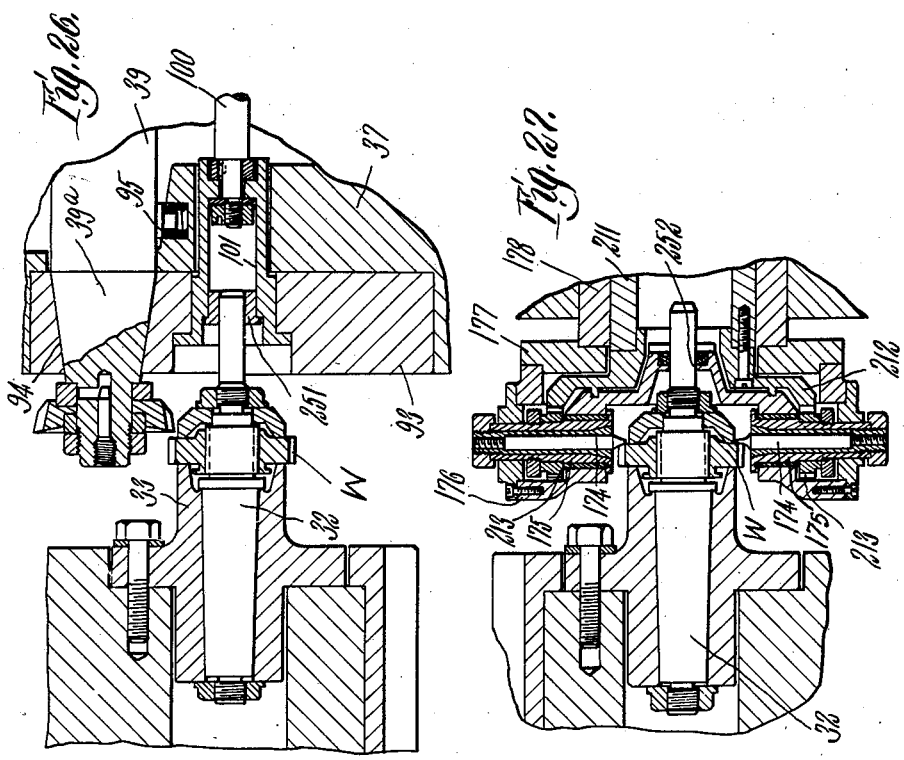
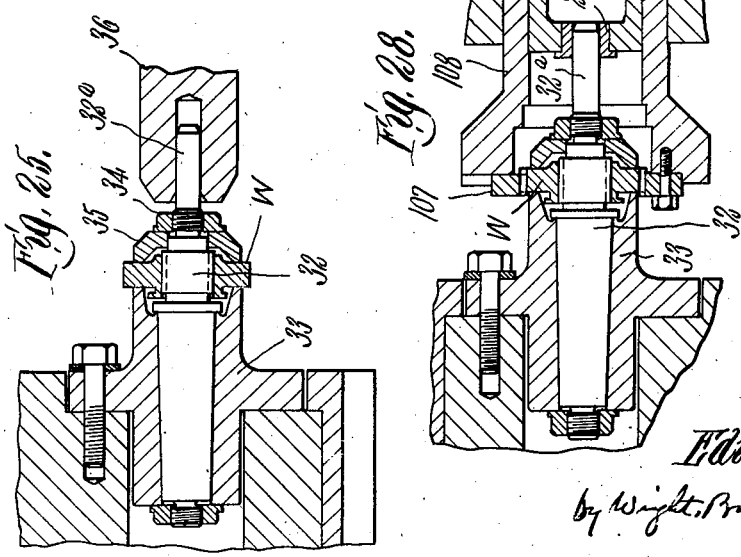

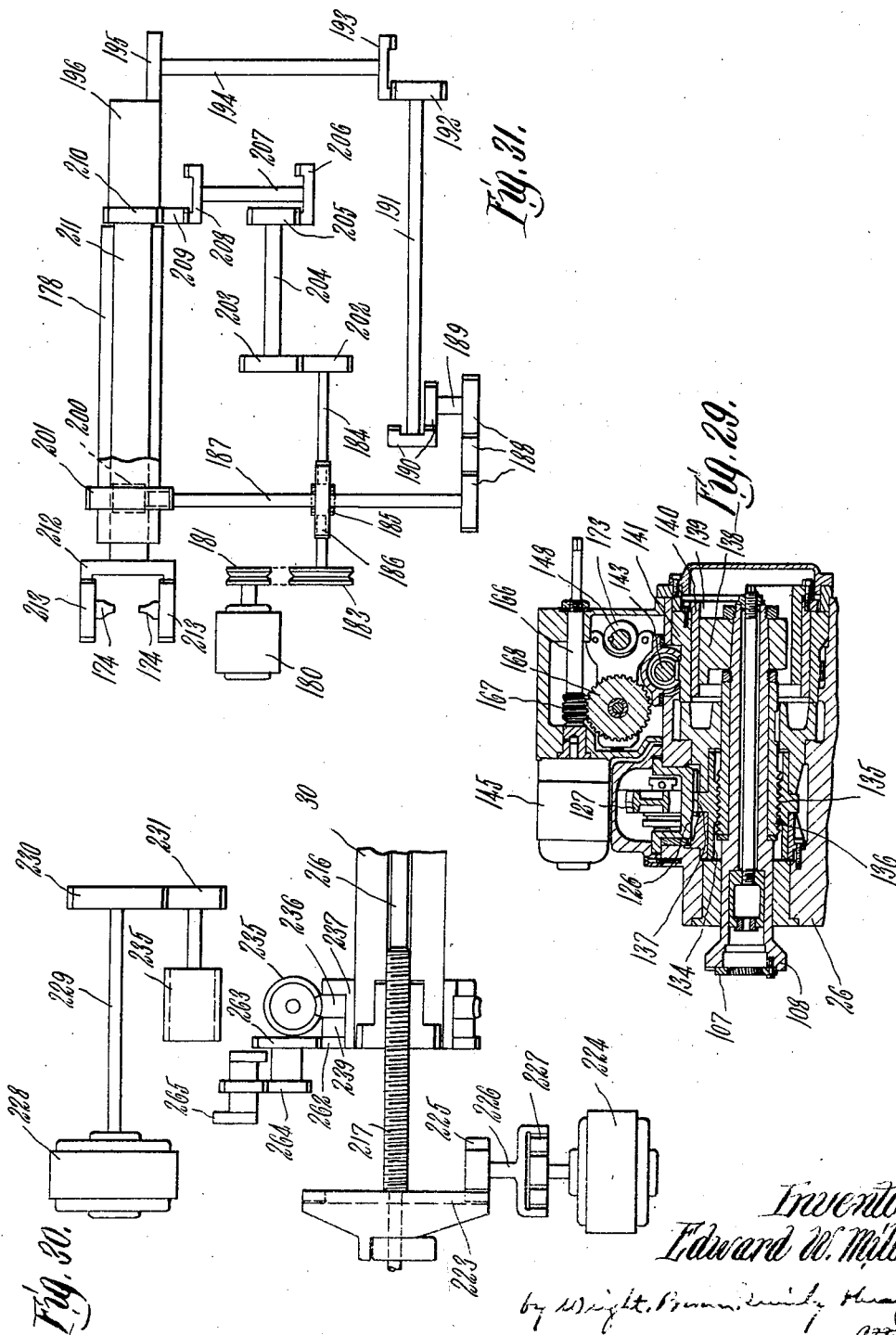

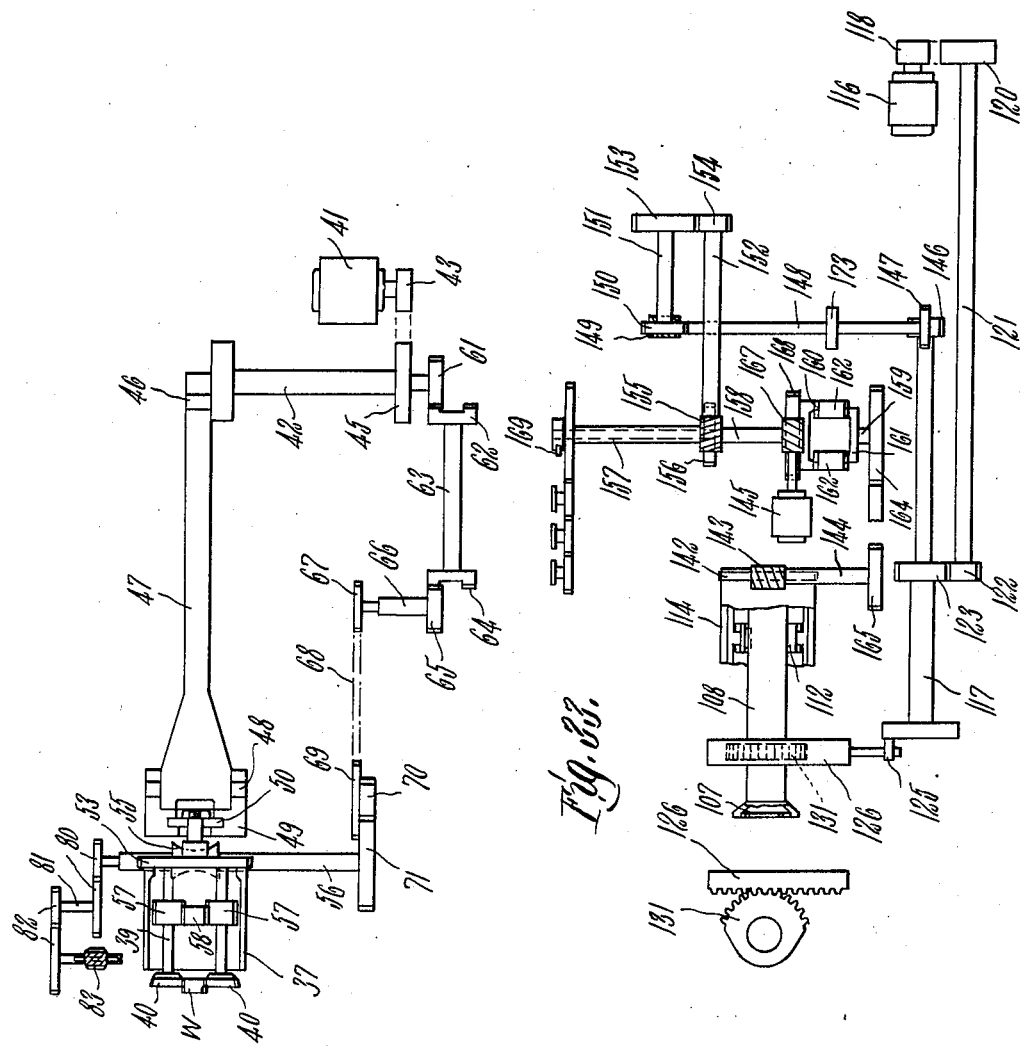

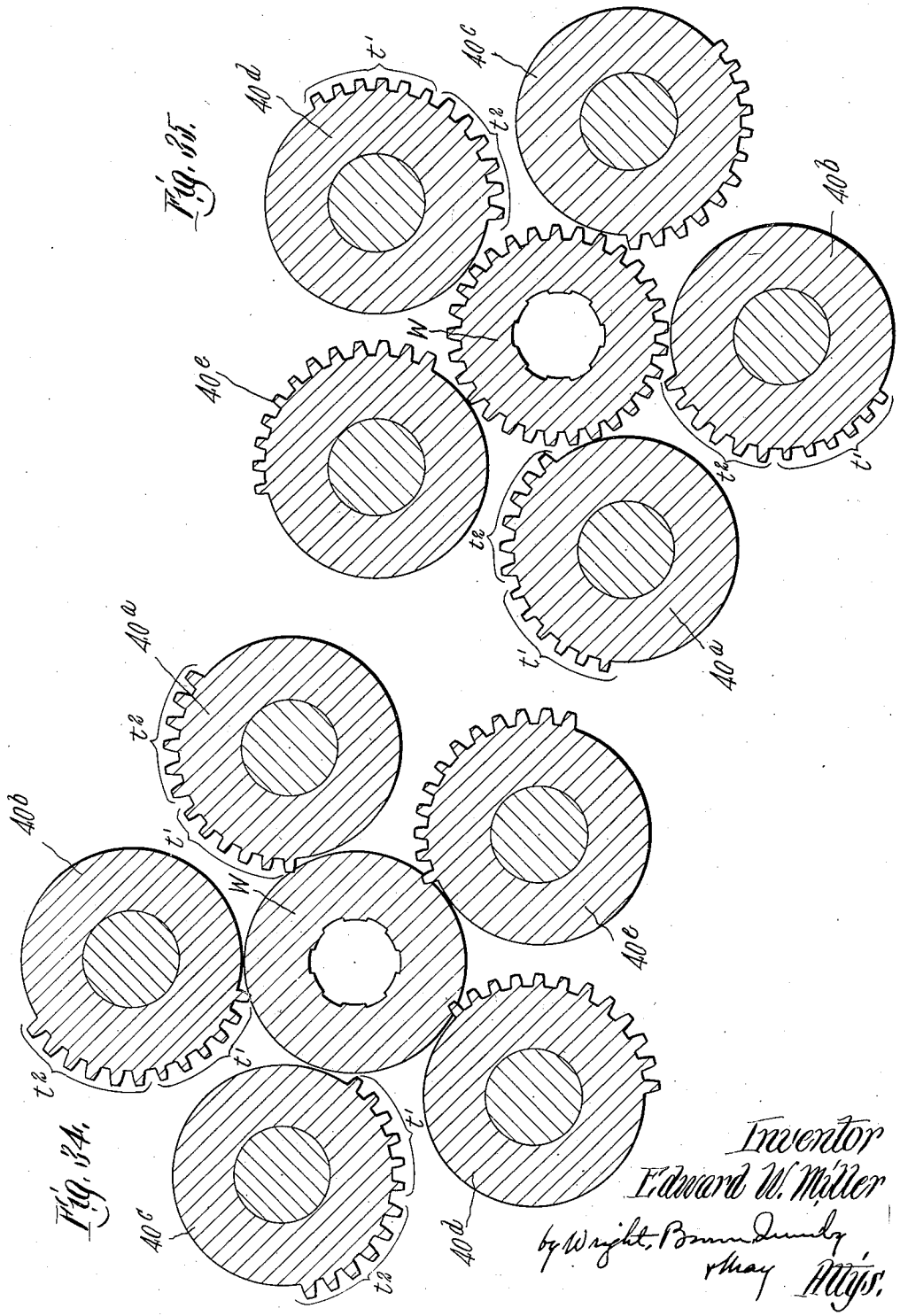

Jan. 27, 1942.   E. W. MILLER   2,271,438
GEAR CUTTING AND FINISHING MACHINE
Filed April 9, 1938   14 Sheets-Sheet 14
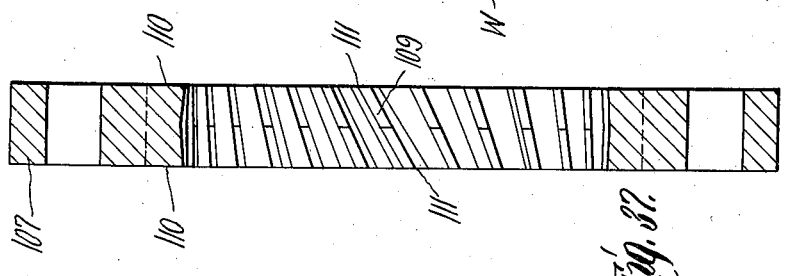
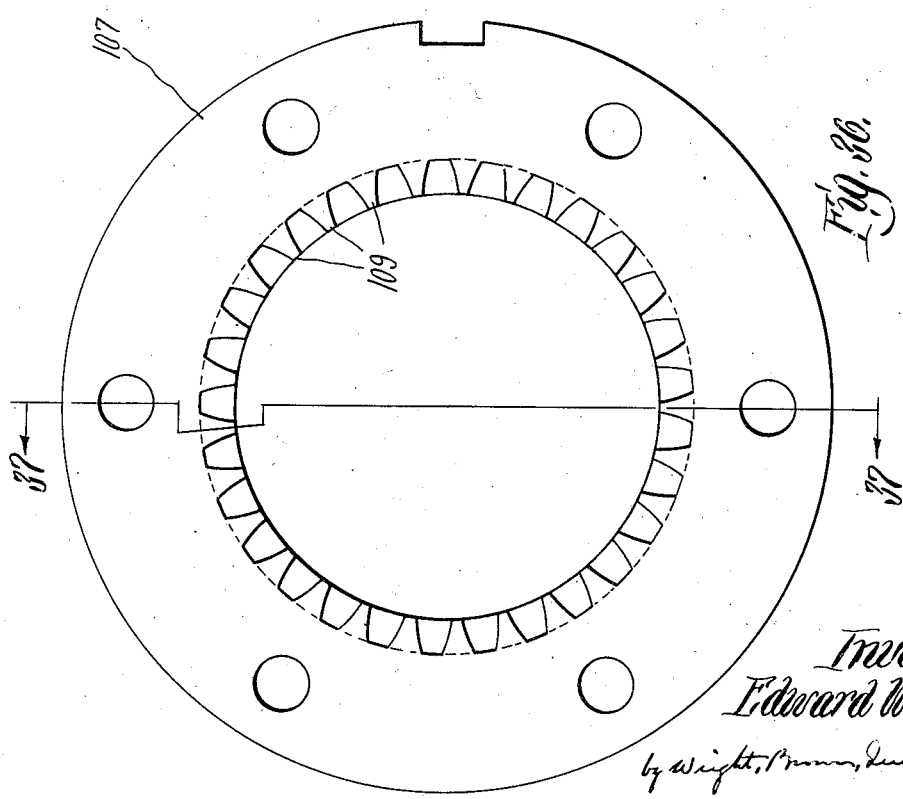

Patented Jan. 27, 1942

2,271,438

UNITED STATES PATENT OFFICE 2,271,438

GEAR CUTTING AND FINISHING MACHINE

Edward W. Miller, Springfield, Vt., assignor to The Fellows Gear Shaper Company, Springfield, Vt., a corporation of Vermont Application April 9, 1938, Serial No. 201,142

8 Claims. (Cl. 90—1.4)

The subject of the present invention is a combined machine by which gears are generated and cut from blanks, chamfered and rounded at the ends of their teeth, and finished to exact form and dimensions, all in a continuous series of related operations, without any handling of the gear between the operations. For this purpose the machine is provided with a turret carrying a number of non-rotatable arbors or equivalent holders to which the gear blanks are secured immovably and by which they are carried successively from a loading and discharging station to the working stations where, in turn, the teeth are cut or roughed out with over size dimensions, their ends are rounded or beveled, and their sides are finally shaped to the final finished form and spacing. The machine includes further a roughing head by which a plurality of segmental gear shaper cutters are carried and caused to operate simultaneously and progressively on the same gear blank; each cutter generating a fraction of the whole number of teeth to be cut, and all the cutters together generating the full number with the proper spacing between them. The machine further includes a tooth rounding head which carries a plurality of milling cutters of which the profile of their cutting edges is shaped to give the desired rounded, chamfered or beveled curvature to the tooth ends. The several milling cutters act simultaneously on a like number of teeth and the head is moved with a combination of movements such that the rounding cutters are advanced into spaces between the ends of the teeth in curved paths which have components axial and circumferential with respect to the gear. The machine includes further a finishing head which comprises a cutter carrying spindle and a cutter having the same number of teeth as the roughed out gear, accurately formed and accurately spaced cutting edges, arranged on a pitch circle equal in diameter to the pitch circle of the work piece, but the teeth are narrower than the spaces of the roughed out work gear. Such cutter spindle is reciprocated in a path which carries the teeth of the cutter from end to end through the tooth spaces of the work gear, and is frictionally rotated through small angles in the course of a succession of strokes to give a lateral feed to the cutter teeth, so that the work gear teeth are planed in a succession of cuts to final dimensions all at the same time. The teeth of the finishing cutter have cutting edges at both ends, of which the edges at one end finish the work gear teeth on one side of each in a succession of strokes in the same direction, after which the edges at the opposite end of the cutter are caused to finish the work gear teeth on the opposite side by a succession of strokes in the opposite direction, with reversal of the angular feed of the cutter. Operating means and mechanisms of suitable character are provided for operating the various cutters simultaneously and in correlation with one another. Upon and after the end of the first cycle, finished gears are delivered at intervals of time measured by the time required to carry out one of the three operations. Each of these operations is rapidly performed inasmuch as the tools at all of the stations operate simultaneously at a plurality of points on the work piece.

I have shown in the drawings furnished herewith one embodiment of the invention in a machine which has been successfully used to produce accurate finished gears with a rapidity heretofore unequaled.

In these drawings—

Fig. 1 shows the machine in front elevation;

Fig. 2 is a plan view of the machine partly cut away and shown in horizontal section on line 2—2 of Fig. 1;

Figure 9:
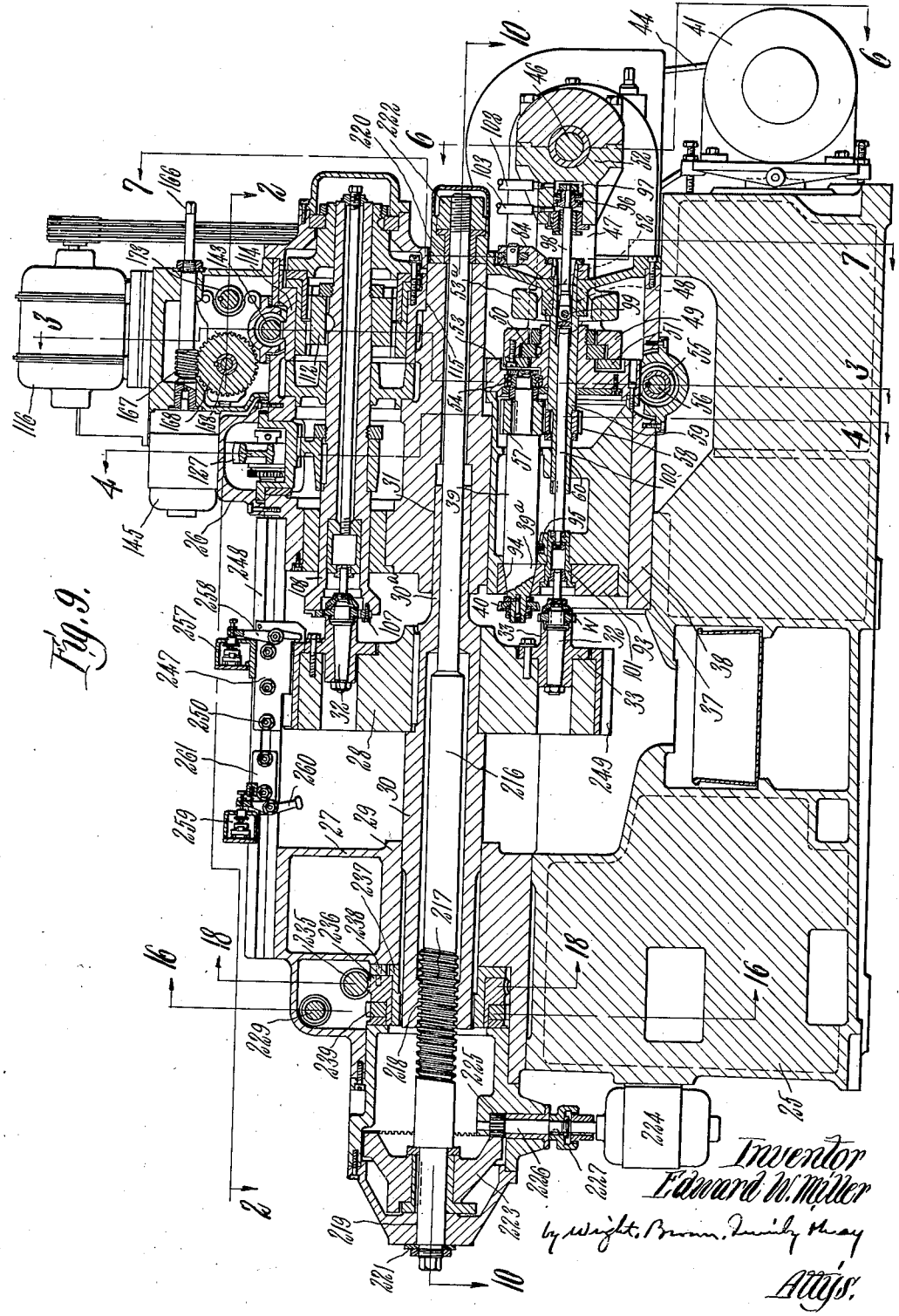

Figs. 3 and 4 are cross sections of the machine taken on lines 3—3 and 4—4 respectively of Figs. 1, 2 and 9;

Fig. 5 is a detail section taken on line 5—5 of Fig. 3;

Figs. 6 and 7 are cross sections taken on lines 6—6 and 7—7 respectively of Figs. 1 and 9;

Fig. 8 is a detail section taken on line 8—8 of Figs. 4 and 7;

Fig. 9 is a vertical longitudinal section of the machine taken on line 9—9 of Figs. 3 and 7;

Fig. 10 is a horizontal section of the machine taken on line 10—10 of Figs. 1 and 9;

Fig. 11 is a partial rear elevation and a partial longitudinal section taken on line 11—11 of Fig. 6;

Fig. 12 is in part a rear elevation and in part a longitudinal section on line 12—12 of Figs. 2 and 7;

Figs. 13, 14 and 15 are detail sectional views taken on lines 13—13, 14—14 and 15—15 respectively of Fig. 12;

Fig. 16 is a cross section on line 16—16 of Figs. 1, 2 and 9;

Fig. 17 is a cross section on line 17—17 of Figs. 2, 16 and 18;

Fig. 18 is a cross section on line 18—18 of Figs. 1, 2 and 9;

Fig. 19 is a detail section taken on line 19—19 of Fig. 18;

Figs. 20, 21 and 22 are detail sections taken on lines 20—20, 21—21 and 22—22 respectively of Fig. 2; the planes on which Figs. 20 and 21 are taken are likewise indicated in Fig. 3;

Figs. 23 and 24 are detail sections taken on the lines 23—23 and 24—24 respectively of Fig. 1;

Fig. 25 is an enlarged detail section of the work arbor and work piece in loading position;

Fig. 26 is a similar view of the work arbor and work piece in the generating cutting position, and shows also a portion of the roughing head and one of the roughing cutters;

Fig. 27 similarly shows the work piece in end rounding position together with a portion of the rounding head and tools;

Fig. 28 similarly shows the work piece in finishing position, together with the finishing cutter and a portion of the cutter spindle;

Fig. 29 is a longitudinal sectional view of a modified form of finishing head and tool adapted for finishing straight toothed gears and gears of small helix angle;

Fig. 30 is a diagram showing the indexing mechanism for the work holding turret;

Fig. 31 is a diagram of the mechanism for driving the rounding tools;

Fig. 32 is a similar diagram of the generating mechanism;

Fig. 33 is a similar diagram of the gear finishing mechanism and driving means;

Fig. 34 is a diagram explanatory of the principle according to which the generating and rough cutting operation is performed, showing the cutters at the commencement of the operation;

Fig. 35 is a similar diagram showing the cutters after conclusion of the operation;

Fig. 36 is an end view of the finishing cutter, in the drawing herewith filed the cutter selected for illustration is shown full size;

Fig. 37 is a section of the cutter taken on line 37—37 of Fig. 36;

Fig. 38 is a side elevation of a finished gear produced by this machine.

Like reference characters designate the same parts wherever they occur in all the figures.

The base structure 25 of the machine supports at one end a stationary column 26 in which the operating tool heads are mounted, and at the other end a box 27 supporting the mechanism by which the work holding turret 28 is indexed, and containing a bearing 29 (Fig. 9) for the main shaft or spindle 30 of the turret. The shaft 30 has an extension 30a which occupies a bearing 31 in the column 26 to afford additional support and guidance for the turret. The turret carries four work arbors 32, equidistant from and spaced equiangularly about the axis of the shaft. These arbors are secured in holders 33, the construction of which and mode of attachment to the turret are intelligibly shown in the drawings, particularly Figs. 25-27. The gear blanks are placed on an accurately dimensioned cylindrical part of the arbor and clamped against the annular end of the holder by a nut 34 and a collar 35. Each arbor has an extension 32a provided to center the arbor and prevent any deflection when the gear blank is clamped to it and while the tools are operating on the blank. When in loading position the arbor extension enters a socket in a rigid bar 36 which is held by the column 26 in the position best shown by Fig. 10. After each cycle of the cutting tools the turret is withdrawn clear of the tools, indexed, and returned to operating position with each of its arbors advanced 90° from the previous position. Before such return the finished gear is removed from the arbor in the loading location and a new gear blank placed on it. Its clamping nut is tightened up while the extension of this arbor is engaged with the centering bar 36. Before describing the means for thus operating the turret, the operating tools will be described beginning with the

*Roughing head (Figs. 3, 4, 6, 7, 9, 34 and 35).*— This head comprises a rotatable and endwise movable cylindrical carrier or turret 37 contained in a bearing 38 in the lower part of the column 26. A number of cutter spindles 39 are mounted rotatably in this carrier with their axes parallel to and equidistant from the axis of the carrier. They are likewise spaced equal distances from one another. Their ends protrude toward the work holding turret and carry segmental cutters 40 of gear shaper type. That is, the cutters have peripheral teeth similar to gear teeth except that they are provided with cutting edges at one end and their sides and tops are inclined to provide cutting clearance. The teeth extend only part way around the circumference of each cutter, leaving a toothless segment or gap sufficiently wide to permit placement of the work piece blank in pitch circle tangency with the cutters, or in other words at the correct center distance from the cutters to permit cutting of teeth to the full prescribed depth without any preliminary radial depth feed.

The cutters are revolved bodily around the axis of the work piece and simultaneously rotated individually about their own axes, at speeds corresponding to those of planet pinions rolling in mesh with a sun gear; and they are also reciprocated endwise to perform the cutting operation. In this illustration each cutter has two groups of teeth equal in number to one another of which those in one group designated $t'$ are shorter and thinner than those of the second group, designated $t^2$, in order to perform their cutting functions in two steps. The number of teeth in each group is at least as great as the number of teeth designed to be cut in the work piece divided by the number of cutters; but may be greater. Thus, in the present illustration, where a gear with 29 teeth is to be cut and five cutters are provided, each group of teeth $t'$ and $t^2$ in each cutter contains six teeth. The cutters are identified for convenience in Fig. 35 of the drawings as 40a, 40b, 40c, 40d and 40e. This phase of the machine embodies the principles of the invention entitled Method of gear generation and apparatus for performing such method disclosed in the patent of Everard Stubbs No. 2,121,840, granted June 28, 1938, to the assignee of the present application.

Power for actuating the roughing cutters is furnished by an electric motor 41, called the roughing head motor, which drives a crank shaft 42 through a belt drive, or sprocket and chain drive 43, 44, 45, (see Figs. 6 and 12). A crank pin 46 is coupled with the cutter spindle carrier 13 by a connecting rod 47, wrist pin 48 (shown by dotted lines in Fig. 9) and a coupling 49. The latter is a circular plate having a recess in one face which receives a disk 50 secured to a portion of the carrier 37, and a ring 51 is screwed to the rim of the plate overlapping the disk 50. The plate 50 is provided with spaced lugs 52 which embrace the connecting rod and receive the ends of the wrist pin 48. The part of the carrier to which the disk 50 is keyed and clamped is a coaxial boss having a longitudinal central bore, and the parts 49, 50 and 51 constitute a thrust bearing through which the spindle carrier may be reciprocated and permitted to rotate at the same time. The connecting rod is constructed of two laterally separated parallel bars, shown at 47a and 47b, in Fig. 7, secured at one end to, or integral with, one member of the bearing box 52 which embraces the crank pin. The inner ends of these bars are connected together by cross members 53a. The plural bar construction of the connecting rod is an important feature, as it is so constructed as to apply thrust to the spindle carrier equally at points on opposite sides of the axial line and equally distant from such line. The center distance between the bars of the connecting rod is approximately equal to, and may be greater than, the diameter of the circle in which the cutter spindles are located. Consequently a balanced thrust is applied to the carrier, which avoids any possibility of the carrier cramping or binding in its guideway.

The spindle carrier 37 is built of two or more parts rigidly connected together, of which one of the parts, 53, is a massive circular head secured to the outer end of the main body of the carrier, and having in its central part the threaded boss to which the thrust bearing disk 50 is secured. This head contains thrust bearings 54 between its central part and rim, in which the cutter spindles are rotatably centered at one end and by which endwise cutting and return movements are imparted to the spindles.

The outer circumference of the head 53 is provided with gear teeth, with which a worm 55 on a shaft 56 meshes. The length of this head and its teeth is enough greater than the length of the cutting path of the cutters to maintain mesh with the worm throughout the entire cutting and return strokes. Such worm, being rotated by mechanism presently described, rotates the spindle carrier and thereby revolves the cutter spindles. The latter are at the same time rotated about their own axes by pinions 57 severally secured to them, meshing with a sun gear 58 fast on a normally stationary bar 59 mounted in the central bore of the head 53 and in an alined bearing 60 of the spindle carrier structure. The sun gear 58 has the same pitch diameter as the work piece W and the pinions 57 the same pitch diameter as the cutters, whereby the cutters are rotated at the correct speed. The meshing teeth of such gear and pinions also guide the cutter teeth in the correct paths for cutting either straight teeth, or helical teeth of any prescribed helix angle. When helical gears are to be cut, a helical cutter is used and gears 57, 58 with helical teeth of the same lead as the cutter are provided. For cutting straight teeth, the cutter and gears 57 and 58 all have straight teeth likewise.

The drive for the worm shaft 56 is derived from the crank shaft 42 through a pinion 61 (Figs. 6 and 11) on the crank shaft, a meshing crown gear 62 on shaft 63, a crown gear and pinion couple 64, 65, shaft 66, sprocket and chain drive 67, 68, 69 (Figs. 11–15), and change gears 70, 71, the latter gear being loosely mounted on the worm shaft 56 but coupled to it by the clutch device presently described so as to impart rotation in the forward direction.

The purpose of the large number of cutters provided is to shorten the time of roughing out a gear by dividing the work among the several cutters. Hence each cutter has a comparatively small number of teeth occupying a minor fraction of its circumference. In order to shorten the time required to complete the rotation of the cutters to starting position after their work has been done, a fast feed motor 72 is provided which drives a pulley 73 (fixed on the worm shaft 56) by a belt 74. The pulley constitutes or carries one member of an overrunning clutch (in this instance a ratchet wheel 76). The other member of the clutch is a pawl 76 secured to the gear 71. The fast feed motor is started and stopped at the prescribed points in the cycle by a switch 77 (Figs. 1 and 3), operated by cams 78 and 79 which are driven from the worm shaft 56 by gears 80, shaft 81, change gears 82 and worm wheel 83 on the cam shaft. Each cam has a single projection to act on the switch, one of which closes the switch and the other opens it. By adjustment of the cams and change gears the timing of the motor may be correlated to different ratios between the blank and toothed segments of the cutters. The switch used here is a standard article of electrical equipment, not invented by me, and therefore not here shown in detail.

The cutter driving and controlling mechanisms are shown in a diagrammatic way in Fig. 32, to which reference is directed to supplement the foregoing description; the same reference characters being applied to corresponding parts.

The cutters are relieved, both radially and angularly, to avoid rubbing on the return strokes. The angular relief is afforded by giving the sun gear 58 a slight turning motion about its axis. The bar 59, on which gear 58 is secured, carries, keyed to its outer end, an arm 84 which is coupled by a link 85 with the rod 86 of a piston 87 operating in a pneumatic or hydraulic cylinder 88. Pipes 89 and 90 conduct the working fluid to and from the spaces in the cylinder at opposite sides of the piston. At one end of its stroke the piston abuts against the cylinder head, as shown in Fig. 7. Its stroke away from the head is limited by an adjustable stop 91 mounted on the machine frame in the path of an abutment carried by an arm 92 rigid with the arm 84. During the working strokes of the cutters the piston is held by pneumatic pressure against the cylinder head, and during the return strokes the arm 92 is held against the stop 91. Adjustment of the latter enables any desired amount of relief to be given.

The radial relief is afforded by endwise movement of a plate 93 in the left hand end (with respect to Figs. 9 and 26) of the spindle carrier 37. The plate has tapered bearings 94 in which tapered portions 39a of the cutter spindles fit rotatably and by which the spindles are centered accurately during the cutting strokes. Prior to the return strokes the plate 93 is moved endwise enough to loosen the spindle bearings, whereupon rodially acting springs 95 (one for each spindle) move the spindles outward. The plate is moved back and forth by a piston 96 in a cylinder 97 contained in the connecting rod box 52. The piston rod 98 is connected by a wrist pin 99 (coaxial with the main wrist pin 48) with a rod 100 which is slidable lengthwise through an axial bore in the bar 59 and has a push and pull connection with a sleeve 101, which in turn is made fast to the plate 93.

The working fluid (preferably compressed air on account of its rapidity of flow, although a liquid may be used), is admitted to and exhausted from opposite sides of the piston 96 through pipes 102 and 103 under control of a rotary valve 104 (Figs. 12 and 13) with which are coupled pipes 105 and 106 leading from a source of fluid under pressure, from the valve to the cylinders 88 and 97, and to the exhaust. The details of this valve are not shown here because they involve nothing new with the present invention and may be of any known character suitable to obtain the desired effects.

*Finishing head.*—The finishing head comprises an annular cutter 107 with internal teeth, a cutter spindle 108, and mechanism for reciprocating said spindle (with a twisting motion when finishing helical gears) and giving it a slow angular feed movement about its axis.

The cutter provided for finishing the helical gear W, shown in Fig. 38, is represented in Figs. 36 and 37. It has helical internal teeth 109, narrower than the spaces cut in the work gear by the roughing cutters. The end faces 110 of the cutter are plane and the cutting edges are formed by the acute angle intersections 111 of both ends of the teeth with such end faces. The teeth are equal in number to those of the work gear; they are located with the highest obtainable accuracy equidistant from one another on the same pitch circle as the work gear, and the curvature of their side faces is as nearly as possible the exact curvature required of the finished work. I have found it possible in practice to obtain an accuracy of tooth curvature, spacing and concentricity well within the limits of tolerance requred in commercial practice for the most accurate gears. The thickness of the teeth and the curvature of their side faces is the same from end to end wherefore, when they are sharpened by grinding off the end faces of the cutter, no change results in either their dimensions or their forms. Cutting clearance is afforded by making the helix angle of the cutter teeth somewhat steeper than the helix angle of the work gear teeth, and by beveling the tops of the teeth from both ends to their mid length points. For cutting gears with straight teeth, a cutter is used in which the teeth have a small helix angle, i. e., just enough to provide clearance.

In the machine shown in all the figures of the drawings except Fig. 29, the helical advance and retraction of the cutter is effected by the rotation of the spindle combined with a screw and nut action. A collar 112 (Figs. 3 and 9) having a plurality of external helical ribs 113 is keyed and clamped on the spindle 108. These ribs fit in complemental guideways in a sleeve 114 rotatable in a fixed bearing 115 in the column 26. Such helical ribs and guideways have the same lead as the teeth of the work piece but a considerably greater diameter (more than twice as great), wherefore their helix angle with respect to the axis is larger than the corresponding angle of the work gear teeth. Thus it is possible to operate the spindle by such screwing action for cutting teeth of small helix angle.

The spindle is oscillated by an electric motor 116, which I call the finishing head motor, driving a crank shaft 117 (Fig. 12) through a belt and pulley, or sprocket and chain, drive 118, 119, 120, shaft 121 and gears 122, 123. A disk 124 on crank shaft 117 carries a radially adjustable crank pin 125, which is coupled to an endwise movable slide 126 (Fig. 4) by a connecting rod 127, wrist pin 128, and adjustable wrist pin holder 129. The slide is provided with rack teeth 130 which mesh with the teeth of a gear segment 131 secured and keyed to the spindle. The adjustment of the wrist pin holder by means of a tubular screw 132 and nut 133 serves to correlate the teeth of the finishing cutter with the teeth and tooth spaces generated in the work by the roughing cutters. It will be apparent from Figs. 1 and 9 that the finishing cutter spindle is at the opposite side of the work turret axis from the roughing head, and that it protrudes from the column 26 toward the work turret in axial alinement with one of the stopping positions for the work arbors and far enough to embrace the gear blank in the course of its strokes. Fig. 9 shows this spindle in mid stroke. Its full stroke is sufficient to carry the cutter all the way through the work piece from one side to the other. Adjustment of the crank pin 125 enables the stroke to be varied for work pieces of greater or less length. A similar adjustment, which in itself is a well known feature of machine design, is provided for the crank pin 46 by which the cutter carrier of the roughing head is reciprocated, and is indicated in Fig. 6.

An alternative reciprocating mechanism for the cutter spindle is shown in Fig. 29, in which a sleeve 134, rotatable in a fixed bearing, has an internal screw thread 135 meshing with a screw 136 which is secured externally on the spindle. Said sleeve has a series of external teeth 137 corresponding to the segment 131 and meshing with the rack teeth of the slide 126. The spindle carries on its outer end a guide member 138 engageing complemental guides 139 in the interior of a sleeve 140 which is made fast to the interior of a sleeve 141. The guides 138 and 139 correspond to the cutter spindle guides of the commercial Fellows Gear shaping machines and control the rotation of the spindle in the same way. They may be helical in various degrees or parallel to the axis of the spindle for use respectively in finishing helical gears of which the teeth have various helix angles, or straight toothed gears.

The sleeve 114, and likewise sleeve 141, is rotated slowly in the cycle of operations in order to give minute increments of angular feed between the cutting strokes. Each stroke removes a light and thin cutting, and the angular feed is continued in one direction until the teeth of the work gear have been finished on one side. Such sleeve carries teeth 142 on its circumference, meshing with a worm 143. The worm shaft 144 is driven from the crank shaft 117, and from a torque motor 145 by the following mechanism.

A helical gear 146 on the crank shaft 117 drives a helical gear 147 on a transverse shaft 148. A worm 149 on said shaft drives a gear 150 (Fig. 20) on a transmission shaft 151, which drives a parallel shaft 152 (Fig. 21), through external changeable gears 153 and 154. These latter gears are called the finish feed change gears because, by substitution of other gears of different ratio, the rate of rotation of the worm 143 may be varied. Shaft 152 is equipped with a worm 155 which meshes with a gear element 156 on a sleeve 157 which surrounds rotatably a portion of a shaft 158 mounted parallel to the shaft 148. A shaft 159 is alined with shaft 158 and driven by the latter through differential gearing consisting of crown gears 160 and 161 on the respective shafts and intermediate pinions 162 journaled in a pinion carrier 163 and meshing with the crown gears. Shaft 158 drives the worm shaft 143 through gearing 164 and 165. The shaft 166 of the torque motor carries a worm 167 which drives a worm wheel 168 fast on shaft 158. A dog 169 (see Fig. 1) is secured to the sleeve 157 and located between two abutments 170 and 171 which are secured to the end of the shaft 158. The torque motor tends constantly to rotate shaft 158 at a rate faster than the rotation of sleeve 157 (which is driven from the crank shaft 117 by the train of gearing described), but the shaft is restrained by the dog 169 to rotate at the same speed as sleeve 157.

The pinion carrier 163 of the differential mechanism has two arms (Fig. 22) equipped with rollers 172 which embrace and bear on a cam 173 secured to shaft 148. The ratio of the gearing 146–147 is one to one, and the cam is arranged so that at the end of each cutting stroke it shifts the carrier 163 through a small angle in one direction and at the end of the return stroke it shifts the carrier equally in the opposite direction. This slight movement suffices for relief of the cutter to avoid rub during the non-cutting strokes. Otherwise the carrier is restrained from rotation and the rotation of shaft 158 is transmitted to the worm 143 at a fixed ratio.

A simplified diagram of the driving mechanism for the finishing head is given in Fig. 33 to supplement the foregoing description.

*Tooth rounding head.*—A plurality of rounding tools 174 (see Fig. 27), which are milling cutters having their cutting edges conforming to the contours desired to be given the ends of the tooth in rounding off, are secured in chucks 175, rotatably mounted in bearings 176 on a head 177 which is secured to a slide 178 mounted in a guideway 179 (Fig. 10) in the column 26. Said cutters are arranged radially of one of the working locations with their inner ends (on which their cutting teeth are provided) equidistant from the axis of the work piece in that location and so disposed as to act simultaneously on a like number of the work gear teeth. The tools are rotated at a suitable cutting speed; and the slide 178 which carries them is rotated about its axis, and is moved endwise forward and back at intervals so correlated to the rate of such rotation and the number of teeth of the work gear, that each tool passes a short distance into one end of the tooth space, rounding the corner of the tooth at one side of such space, and then out of the space, cutting off the corner of the tooth at the other side. All of the tools thus operate simultaneously.

An electric motor 180 for operating the rounding head is mounted at the back of the machine and drives a pulley 181, belt 182, pulley 183 on shaft 184, worm 185 and gear 186 on shaft 187 (Fig. 12). Shaft 187 carries one member of a train of external change gears 188 driving a shaft 189 (Fig. 11) which, through a pinion and crown gear couple 190 (Fig. 4) drives a shaft 191 on which there is a pinion 192 driving a crown gear 193 on a cam shaft 194 (Fig. 10). A cam 195 on this shaft acts on the outer end of a plunger 196, the inner end of which carries a roll 197 bearing on an abutment plate 198 which is secured to the outer end of the rounding cutter slide 178. A spring 199 acts between a shoulder on this slide and an abutment on the machine structure, holding the plate 198 against the plunger 196, and the latter against the cam 195. Said cam and spring give the above described axial components of motion to the slide whereby the rounding tools are carried into and out of the ends of the tooth spaces in the work piece. The rotary component of motion is given to the slide by a worm 200 on the transverse shaft 187 which meshes with an externally toothed annular gear 201 surrounding the slide 178, and of which the teeth are long enough to maintain mesh with the worm in all axial displacements of the slide.

The cutters are rotated by a gearing consisting of a pinion 202 on shaft 184, a meshing gear 203 on a countershaft 204, a pinion 205 on the latter shaft, a crown gear 206 meshing with 205 and secured to a shaft 207, a crown gear 208 on shaft 207 (Fig. 13), an idle pinion 209 and a gear 210 on a spindle 211 which is fitted to rotate coaxially within the slide 178. A large crown gear 212 on said spindle (Fig. 27) meshes with pinions 213 on the spindles or chucks of all the individual rounding tools. Pinion 209 is withheld from displacement and its face is wide enough to maintain mesh with gear 210 throughout the endwise movements of the slide.

The abutment plate 198 has a depression suitably located to receive the plunger roll 197 when the head has been turned far enough to cause all of the gear teeth to be rounded, and thereby to permit a further backward movement of the cutter head than is permitted by the cam 195 alone. When the head is thus moved outward, a rod 214, which bears on the abutment plate and controls a switch 215 in the circuit of the motor 180, is caused to throw the switch and stop the motor.

A conventional diagram of the driving mechanism for the tooth rounding head and tools is shown in Fig. 31 to supplement the foregoing description.

*Work indexing mechanism.*—The work holding turret 28 is indexed by being withdrawn from the cutting tools, rotated through the angular spacing between the work arbors (in this case 90°) and returned. The means for thus withdrawing and returning the turret consists of a rod 216, coaxially located within the main shaft or spindle 30 of the turret and having a screw threaded portion 217 which meshes with an internally threaded portion or nut 218 in said main shaft. The rod 216 (which may be descriptively called the turret retracting and advancing shaft) extends throughout the length of the machine, being centered at its opposite ends by bearings 219 and 220 in parts of the frame structure, and carrying end thrust abutments 221 and 222 by which its endwise movement is prevented. A crown gear 223 is mounted on and coupled to the screw shaft and is rotated by an electric motor 224 (called the turret slide motor) through a pinion 225 coupled to the armature shaft of the motor by a shaft 226 and a clutch 227.

The turret is rotated by an electric motor 228, herein called the work indexing motor, the armature shaft of which is coupled to a shaft 229 carrying a pinion 230 which meshes with a gear 231 on a shaft 232 (Figs. 16 and 18). The latter gear is rotatable independently of the shaft and imparts rotation thereto through a coupling 233, 234, shown in detail in Fig. 19. Shaft 232 carries a worm 235 meshing with a worm wheel 236 loosely mounted on a sleeve 237, and driving the latter through a key 238 on the side of the worm wheel which fits loosely in a notch in a flange on the sleeve 237. Said sleeve is splined to the work turret shaft 30 to permit endwise movement of the latter; the sleeve and its associated parts being confined by end thrust abutments in the frame structure, which prevent their endwise movement.

A notched index plate or ring 239 is secured to the side of the worm gear 236. This ring has four notches 240 in its outer circumference; i. e., as many notches as the number of work arbors, equally spaced around the circumference, adapted to be entered by the inner end of a radially movable plunger 241. The trailing end wall of each notch and the adjacent side of the plunger end are substantially radial to the notched plate, or nearly enough so to cause a positive arrest of the rotating parts. A spring 242 (Fig. 16) presses the plunger inward. It is retracted by a pinion 243, meshing with rack teeth on the plunger and mounted on a shaft 244 (Fig. 17), to which an arm 245 is secured. The core of a solenoid 246 (shown dotted in Fig. 18) is linked to the arm 245 and is energized at the proper times to withdraw the plunger.

By virtue of the looseness in the indexing mechanism, the turret is stopped approximately in the working positions, but is not accurately located in those positions. Accurate positioning is effected by a lock or key 247 (Fig. 9) which is mounted adjustably on a bar 248 and is adapted to enter any one of four guideways 249 secured to the circumference of the turret. The bar 248 is secured to the column 26 and box 27 so as to bridge across the space in which the turret operates. It has an undercut slot in one side containing the heads of bolts 250 by which the key 247 is clamped to the bar and by which its endwise adjustment is permitted. The key 247 and guideways 249 are accurately fitted to one another, and may be tapered to prevent any side play. The guideways are secured to the turret with provision for circumferential adjustment in locations which cause the work arbors to be accurately centered with the respective tool heads when the key is thus entered in any notch. It will be understood that the reversal of the above described key and notch arrangement is within the scope of this invention. That is, I contemplate providing tapered, or taper ended centering blocks on the turret in place of the guideways 249, and a member having a complemental recess in place of the key 247, secured adjustably to the bar 248 in the manner described.

The work arbors are supported and centered in each working location by their extensions 32a which enter in turn a bushing 251 in the center of the roughing head, an opening 252 in the center of the frame structure of the rounding tool head, and a bushing 253 in the axis of the finishing tool spindle (see Figs. 26–28).

When in any operating position, the work turret is held by the screw 217 firmly against a fixed, but adjustable, stop 254 which protrudes from the column 26 beneath the loading position. The turret is provided with projecting abutments 255 equal in number to the work arbors and suitably located to engage the stop when the turret is in any working location.

The mechanism for operating the turret is shown diagrammatically in Fig. 30.

*Control and operation.*—In addition to push button switches 256 (Fig. 1) in the circuits of the several motors, whereby the motors may be started and stopped manually, the machine is equipped with automatically operated switches in the several motor circuits adapted to correlate the several parts of the machine with one another. A switch 257 is connected in the circuit of the turret displacing motor 224 and is operated by a lever 258 having an arm in the path of advancing movement of the turret, whereby the turret, at the end of its advancing movement, stops the motor 224. This switch and its operating lever are mounted on the lock or key member 247 and adjustable therewith, whereby the stopping point of the turret may be located suitably according to the character of the work piece. This adjustment, together with that of the stop 254, insures that the turret will be rigidly held up against the stop by the advancing screw 217. The turret displacing motor is started in a direction to withdraw the turret by a switch (later described) controlled by that one of the cutting mechanisms which requires the longest time to perform its cycle. It may be assumed for the purposes of this explanation that the finishing head is the one requiring the longest time to complete its cycle, and that one of the switches, hereinafter described, operated by a portion of that mechanism, causes the motor to be started for withdrawing the turret.

A switch 259 operated by a lever 260, and mounted, together with its operating lever, on a plate 261 adjustable along the bar 248, is connected in the circuit of the turret indexing motor 228 and also the circuit of the turret displacing motor 224. The end of lever 260 projects into the path of the turret in its withdrawing movement, and switch 259 energizes the solenoid 246 whereby the locking plunger 241 of the indexing mechanism is retracted, and then stops the motor 224 and starts motor 228.

A gear 262 secured to the side of the notched index plate 239 drives a gear 263 (Figs. 10 and 17), to the shaft of which a gear 264 is secured. The latter gear operates a switch 265 so connected in the circuit of the motor 228 as to stop it, and the gearing 262, 263, 264 is suitably proportioned to throw the switch 265 when any notch 240 of the index plate has come substantially into register with the plunger 241, but before the trailing edge of the notch has passed the nearer edge of the plunger. In other words, taking into account the momentum of the parts, the index motor is stopped at a time which will permit the plunger to enter the nearly approaching notch. The plunger in turn, by means of an outwardly protruding rod or pin 266 controls a switch 267 which is connected in the circuit of the turret displacing motor 224 so as to reverse its direction of rotation and start it in the way to advance the turret.

The operator removes the finished gear from the arbor in loading position, and then places and tightens a blank on that arbor, while the turret is up in the cutting position. The operator can now press the start button while all heads are still cutting, and at the completion of the cutting cycle the cutter heads all stop, the turret retracts, indexes one-quarter of a turn and advances to cutting position, and switch 257 automatically starts the roughing head, finishing head, and rounding head simultaneously.

The sleeve 157 of the finishing head driving mechanism carries a gear 268 (Figs. 1 and 2) which, through a train of gearing 269 operates switches 270 by which the finishing head drive motor 116 and torque motor are stopped, reversed in direction, started in the reverse direction, and again stopped. Such reversal and renewed driving in the opposite direction are necessary to cause the cutter 107 to plane off the teeth of the work gear, with a succession of light cuts first on one side and then on the opposite side; and are accomplished in the following manner.

The shaft 158, driven by the torque motor 145 at the speed permitted by the sleeve 157 (driven by the main motor 116), continues until a dog 271 strikes a fixed stop 272. This causes the shaft 158 to stop while the sleeve 157 continues rotating. At a point determined by the gearing 268, 269 and the switch operating cams, one of the switches 270 operates to reverse the motors 116 and 145. The torque motor 145 immediately turns shaft 158 until the dog 170 strikes dog 169, which brings the cutter approximately into the central or neutral position, whereupon the cutter is slowly rotated in the reverse direction while being reciprocated, whereby it is caused to plane off the gear teeth on the second side. This angular feed motion continues until a dog 273 carried by the shaft 158 strikes the fixed stop 271, whereupon the angular feed is arrested. After a further rotation of the sleeve 157 through a predetermined angle, another element of the switches 270 stops the main motor 116 and reverses the torque motor, causing the cutter to be returned to the original neutral position when the stop 171 again strikes dog 169.

The several dogs 170, 171, 271 and 273 are all fastened to shaft 158 and are independently adjustable to regulate the starting and ending points of the cutting operations on each side of the work gear teeth, according to the prescribed thickness of the finished teeth and the amount of stock left by the preliminary cutting operation to be removed by the finishing operation. Such adjustments are made angularly around the axis of the shaft. They are required from time to time because of the changes in thickness of the roughing cutter teeth caused by repeated sharpenings, and because repeated sharpenings of the finishing cutter change the angular displacement between the cutting edges at the opposite ends of its teeth. The cutting action performed on one side of the work gear teeth is effected by strokes of the cutter from right to left, and upon the opposite side of the teeth by strokes from left to right. All of the work gear teeth are thus acted upon at the same time, each by one of the teeth of the finishing cutter.

There is also associated with the crank disk 124, from which the motion is derived for reciprocating the cutter, a plunger 274 adapted to enter a notch 275 in the crank disk when the cutter spindle is at the end of its stroke farthest from the work turret. This plunger is advanced by a solenoid 276 through arms 277 and 278 and a spring 279 (Fig. 14), when the solenoid is energized to draw its core inward; and is retracted by a spring 280. The action of lever 258 (due to the advancing movement of the turret) on switch 257 deenergizes this solenoid before the commencement of the finish cutting operation, and an element of the switch assemblage 270 energizes it after the gear teeth have been finished on both sides to final width, and when the notch 275 is in register with the plunger.

Another element of the switch assemblage closes the circuit of the turret slide motor 224.

The details of the switches and electrical connections are not illustrated herein, as they are or may be standard equipment and their application to the machine need involve only routine arrangements of circuits. Moreover, the electrical means of correlating the several operations of the machine with one another is but one of several possible means or modes of accomplishing the same result. My invention comprehends the combination of correlated instrumentalities and mechanisms for performing the operations herein described, with any form of suitable means for effecting the desired correlation. Electrical means for this purpose are compact, flexible, and involve the addition of comparatively small weight to the machine as a whole. For these and other reasons they have been adopted for the embodiment of the invention shown herein. But as above explained, the generic invention, in the scope for which I claim protection, embraces all equivalent alternative correlating means.

I have refrained also, in describing the mechanical parts of the machine, from mentioning all the structural parts of the stationary framing and of the tool heads; contenting myself with such description as will explain the principles of the invention and enable the skilled machine designer, with the aid of the drawings and the common knowledge of his calling, to construct and operate the machine. It may be assumed without further description that any necessary provisions, such as those commonly used with machine tools, are provided for lubricating the rubbing surfaces and for cooling and lubricating the cutting tools in their contacts with the work pieces. The essential combinations, sub-combinations and elements of the invention may be embodied in a variety of alternative constructions, all within the scope of the invention as claimed.

What I claim and desire to secure by Letters Patent is:

1. A machine for operating on gears comprising a tooth rounding head, a work carrier having a plurality of gear holding means, means for moving said carrier intermittently to shift its work holding means from a loading position to a working position adjacent to the tooth rounding head, and from said working position to the loading position, means for withdrawing said carrier from the rounding head prior to each of the before named movements and advancing it toward the head at the conclusion of such movements, coacting means on the work carrier and a stationary part of the machine for accurately alining the gear holder in the working location with the tooth rounding head; said head comprising a slide rotatable about the axis of the gear in working location and movable lengthwise of such axis, a milling cutter carried by said slide in position to act on the end of a gear tooth in the working location, and means for moving said slide forward and back in said axial direction and at the same time rotating it, whereby the cutter is carried with a resultant movement in a path enabling it to cut off the corners of the gear teeth.

2. A gear tooth rounding mechanism comprising a gear holder adapted to secure a gear in a prescribed location, a cutter carrier movable axially of the gear so held toward and away from the end of such gear, and also rotatable about the axis of the gear, a milling cutter supported on said cutter carrier in position to engage the nearer end of a gear tooth when the carrier is so advanced, mechanism for advancing and retracting the cutter carrier repeatedly, and means for simultaneously rotating the carrier, whereby the cutter is caused to enter and withdraw from a plurality of tooth spaces of the gear in succession and cut off the corners of the teeth in so moving.

3. In a machine for operating on gears, a tooth rounding mechanism comprising a slide mounted with provision for rotation about a given axis and for moving back and forth in the direction of such axis, means for imparting reciprocating movement to the slide and simultaneously rotating it progressively in one direction, a milling cutter carried by the slide at one side of the axis thereof and mounted to rotate about an axis transverse to that about which the slide is rotatable, and means for rotating the cutter about the latter axis.

4. A tooth rounding mechanism comprising a supporting structure, a slide mounted on said supporting structure rotatably and with provision for reciprocating movement lengthwise of its axis of rotation, a tool holder rotatably carried by said slide at one side of the before named axis and arranged to rotate about an axis transverse to the first named axis, a milling cutter having teeth on one end mounted in said cutter holder with its toothed end protruding toward the axis of the slide but located at a distance therefrom, a spindle fitted rotatably in said slide and geared to the cutter holder for rotating the latter, and correlated mechanisms organized to rotate said spindle at a relatively high speed, to rotate the slide at a lower speed, and to impart a succession of back and forth reciprocating movements to the slide.

5. A gear tooth rounding mechanism comprising a slide mounted to rotate about an axis and to move reciprocatively in the direction of said axis, a head carried by the slide, a plurality of chucks mounted in the head in an arrangement surrounding the axis of the slide and being rotatable about axes radial to the before named axis, milling cutters secured in said chucks protruding therefrom toward the axis of the slide but spaced away from said axis, having teeth on their protruding inner ends, a spindle mounted coaxially and rotatably within the slide, a driving gear carried by said spindle and driven gears on the respective chucks in mesh with said driving gear, and correlated mechanisms for respectively rotating said spindle, rotating the slide, and reciprocating said slide.

6. In a gear producing machine, a tooth rounding mechanism comprising a plurality of cutters arranged around a central axis adapted to act simultaneously on the ends of a plurality of gear teeth concentric with said axis, a rotatable and endwise movable slide by which said cutters are carried, driving means extending through the slide for rotating the cutters, and means for imparting increments of axial and angular rotation to the slide whereby the cutters are caused to enter and leave the ends of tooth spaces in the work piece and cut the corners of the flanking teeth on a bevel.

7. A tooth rounding head comprising a plurality of milling cutters radially arranged around a central point having cutting teeth on their inner ends for acting simultaneously on a plurality of teeth of a gear located with its axis coincident with said central point, bearings holding the cutters rotatably in the arrangement named, means for rotating the cutters simultaneously about their respective axes, and means for transporting the cutters lengthwise of, and rotatably about, the axis of the gear in paths such as to bevel the corners of the gear teeth.

8. A gear tooth rounding head comprising a slide mounted to reciprocate lengthwise and rotate about an internal axis coinciding with its path of reciprocation, bearings secured to said slide radially arranged around said axis, cutting tools rotatably contained in said bearings having teeth on their inner ends and located with their inner ends equidistant from said axis, a spindle rotatably contained in said slide, a gear carried by said spindle adjacent to the cutting tools, gears on the respective cutting tools meshing with the before named gears, and correlated mechanism for rotating said slide and moving it back and forth endwise.

EDWARD W. MILLER.